US008958759B2

(12) United States Patent  
Tsai

(10) Patent No.: US 8,958,759 B2  
(45) Date of Patent: Feb. 17, 2015

(54) METHOD AND STORAGE MEDIUM FOR ADJUSTING WORKING FREQUENCY OF ELECTRONIC DEVICE, AND ELECTRONIC DEVICE

(71) Applicant: Hon Hai Precision Industry Co., Ltd., New Taipei (TW)

(72) Inventor: Ming-Hung Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 79 days.

(21) Appl. No.: 13/898,479

(22) Filed: May 21, 2013

(65) Prior Publication Data

US 2014/0295778 A1    Oct. 2, 2014

(30) Foreign Application Priority Data

Apr. 2, 2013    (TW) .............................. 102111874 U

(51) Int. Cl.
*H04B 1/44*     (2006.01)
*H04B 17/00*    (2006.01)
*H04B 7/04*     (2006.01)

(52) U.S. Cl.
CPC ................ *H04B 7/0404* (2013.01); *H04B 1/44* (2013.01)
USPC ......................................... 455/78; 455/67.11

(58) Field of Classification Search
USPC .................. 455/67.11, 73, 78, 550.1
See application file for complete search history.

(56) References Cited

U.S. PATENT DOCUMENTS

| 7,702,289 | B2 * | 4/2010 | Tzavidas et al. ............ 455/67.11 |
| 8,190,192 | B2 * | 5/2012 | Llanos et al. .............. 455/550.1 |
| 8,396,507 | B2 * | 3/2013 | Lekutai ..................... 455/550.1 |
| 8,650,577 | B2 * | 2/2014 | Kim .............................. 455/73 |

* cited by examiner

*Primary Examiner* — Quochien B Vuong
(74) *Attorney, Agent, or Firm* — Novak Druce Connolly Bove + Quigg LLP

(57) ABSTRACT

A method for adjusting a working frequency of an electronic device includes the following. First, determining a current working frequency of the electronic device, a minimum average frequency among the average frequencies of different channels, and a frequency range of one channel used for transmitting/receiving wireless signals. Second, calculating an interference frequency generated by the electronic device, and selecting another antenna to transmit/receive wireless signals when the interference frequency falls within the frequency range of the determined channel. Third, calculating a first time interval between transmitting and receiving wireless signals before switching to the other antenna, and a second time interval between transmitting and receiving wireless signals after switching to the other antenna. Fourth, determining a difference between the first and second time intervals. Fifth, adjusting the current working frequency to decrease the influence on the transmission/receipt of wireless signals when the calculated difference is greater than a predetermined threshold.

6 Claims, 2 Drawing Sheets

METHOD AND STORAGE MEDIUM FOR ADJUSTING WORKING FREQUENCY OF ELECTRONIC DEVICE, AND ELECTRONIC DEVICE

BACKGROUND

1. Technical Field

The present disclosure relates to an electronic device with a storage unit for automatically adjusting the working frequency of the electronic device, and to a method and a storage medium for automatically adjusting the working frequency of an electronic device.

2. Description of Related Art

When the running speed of a processor of a communication device (e.g. a smart phone) increases, a working frequency of the communication device correspondingly increases. When the working frequency increases, transmission and/or receipt of wireless signals of the communication device may be adversely influenced by the high working frequency.

In a typical communication device, once the working frequency of the communication device is detected to be influencing the transmission/receipt of wireless signals, the running speed of the processor is automatically decreased to correspondingly decrease the working frequency. Thereby, the influence on the transmission/receipt of wireless signals is diminished.

However, under some conditions, the influence on the transmission/receipt of wireless signals is not great, such that the wireless signals are still able to be normally transmitted and received. In such situations, even though the transmission/receipt of wireless signals is influenced, there may be no need to decrease the running speed of the processor. Thus when the running speed of the processor is automatically decreased, the operation of the communication device may be unnecessarily constrained.

Therefore, there is a need to provide a means and a method to overcome the above-described shortcomings.

BRIEF DESCRIPTION OF THE DRAWINGS

Many aspects of the present disclosure should be better understood with reference to the following drawings. The emphasis is placed upon clearly illustrating the principles of the present disclosure.

DETAILED DESCRIPTION

Figure 1:
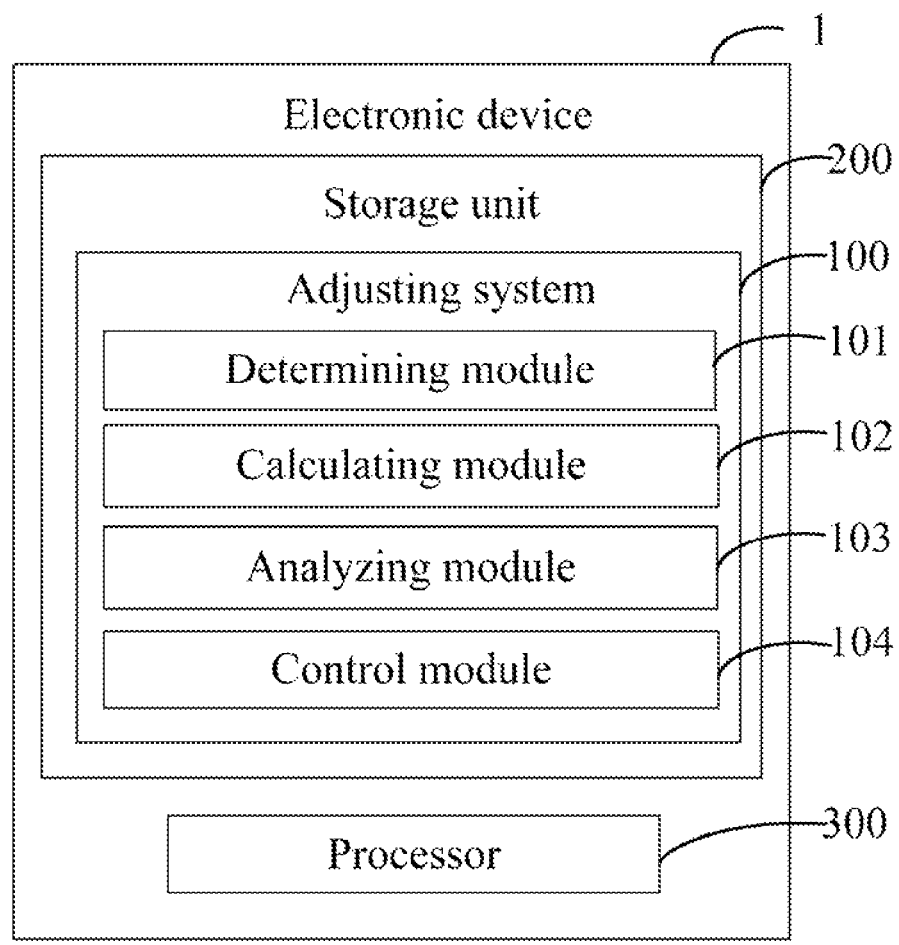
FIG. 1 is a block diagram of an electronic device for adjusting a working frequency thereof, in accordance with an exemplary embodiment.

FIG. 1 is a block diagram of an electronic device 1 according to an exemplary embodiment. The electronic device 1 includes at least two antennas (not shown) for transmitting and receiving wireless signals. The antennas correspond to different channels of the electronic device 1, respectively. In the embodiment described hereinafter, unless the context indicates otherwise, there are two antennas, one antenna corresponds to a portion of eleven channels of the electronic device 1, and the other antenna correspond to the remaining portion of the eleven different channels of the electronic device 1. The electronic device 1 further includes a storage unit 200 and a processor 300. The working frequency of the electronic device 1 is determined by the running speeds of the storage unit 200 and the processor 300. If the working frequency is too high, it may adversely influence the transmission and/or receipt of wireless signals in each channel. The storage unit 200 stores a table (see below). In the table, each channel corresponds to an average frequency and a frequency range for transmitting and receiving wireless signals. The storage unit 200 further stores an adjusting system 100. The adjusting system 100 includes a variety of modules executed by the processor 300 to adjust the working frequency of the electronic device 1. A detailed description of the variety of modules is provided below.

| Channels | Average frequency (MHz) | Frequency range (MHz) |
| --- | --- | --- |
| 1 | 2412 | 2401~2423 |
| 2 | 2417 | 2406~2428 |
| 3 | 2422 | 2411~2433 |
| 4 | 2427 | 2416~2438 |
| 5 | 2432 | 2421~2443 |
| 6 | 2437 | 2426~2448 |
| 7 | 2442 | 2431~2453 |
| 8 | 2447 | 2436~2458 |
| 9 | 2452 | 2441~2463 |
| 10 | 2457 | 2446~2468 |
| 11 | 2462 | 2451~2473 |

In the embodiment, the adjusting system 100 includes a determining module 101, a calculating module 102, an analyzing module 103, and a control module 104.

The determining module 101 determines a current working frequency of the electronic device 1 according to the running speeds of the storage unit 200 and the processor 300. The determining module 101 then determines a minimum average frequency in the table. The determining module 101 further determines the channel currently used for transmitting/receiving wireless signals and the frequency range of the determined channel according to the table.

The calculating module 102 calculates an interference frequency generated by the electronic device 1 according to the current working frequency of the electronic device 1, the minimum average frequency, and the frequency range of the determined channel. A detailed description of the calculation of the interference frequency is provided below.

Take the electronic device 1 with a current working frequency $v_c$ of 162 megahertz (MHz) as an example. In the table, the minimum average frequency $v_{min}$ is 2412 MHz, which is the average frequency of channel 1. The currently used channel is channel 6. The calculating module 102 calculates a bandwidth BW of channel 6 according to the formula: BW=(maximum frequency in the frequency range)−(minimum frequency in the frequency range). Thus BW=2448−2426=22 MHz. The calculating module 102 then calculates the interference frequency $v_i$ according to the following formula:

$$v_i = v_c \times \left\{ \ln\!\left[\frac{v_{min} - (BW)/2}{v_c}\right] + 1 \right\} =$$

$$162 \times \left\{ \ln\!\left[\frac{2412 - 22/2}{162}\right] + 1 \right\} = 2430 \text{(MHz)}$$

The analyzing module 103 determines whether the interference frequency falls within the frequency range of the determined channel. If so, the analyzing module 103 determines that the interference frequency generated by the electronic device 1 will adversely influence the transmission/receipt of wireless signals in the determined channel. In the above-mentioned example, since the interference frequency of 2430 MHz falls within the frequency range of 2426~2448 MHz, the analyzing module 103 determines that the interference frequency generated by the electronic device 1 will adversely influence the transmission/receipt of wireless signals in channel 6.

The control module 104 selects another antenna to transmit and receive wireless signals when the analyzing module 103 determines that the interference frequency falls within the frequency range of the determined channel.

The calculating module 102 further calculates a first time interval between transmitting and receiving wireless signals before switching to the other antenna, and a second time interval between transmitting and receiving wireless signals after switching to the other antenna. The calculating module 102 then determines a difference between the first time interval and the second time interval to determine how much the influence is. It is known that the less the influence, the less the difference between the first and second time intervals.

The analyzing module 103 further compares the calculated difference with a predetermined threshold value. If the calculated difference is greater than the predetermined threshold value, the analyzing module 103 determines that the working frequency of the electronic device will greatly influence the transmission/receipt of wireless signals of the determined channel; otherwise, the analyzing module 103 determines that the interference frequency will not greatly influence the transmission/receipt of wireless signals of the determined channel.

The control module 104 then adjusts the current working frequency of the electronic device 1 to decrease the influence on the transmission/receipt of wireless signals when the calculated difference is greater than the predetermined value.

With the above-described configuration, the adjusting system 100 adjusts the current working frequency of the electronic device 1 only when the adverse influence on the transmission and receipt of wireless signals is greater than the predetermined value. Thus, when the adverse influence is less than the predetermined value, decreasing of the running speed of the processor 300 is avoided, and the working of the electronic device 1 is not affected.

Figure 2:
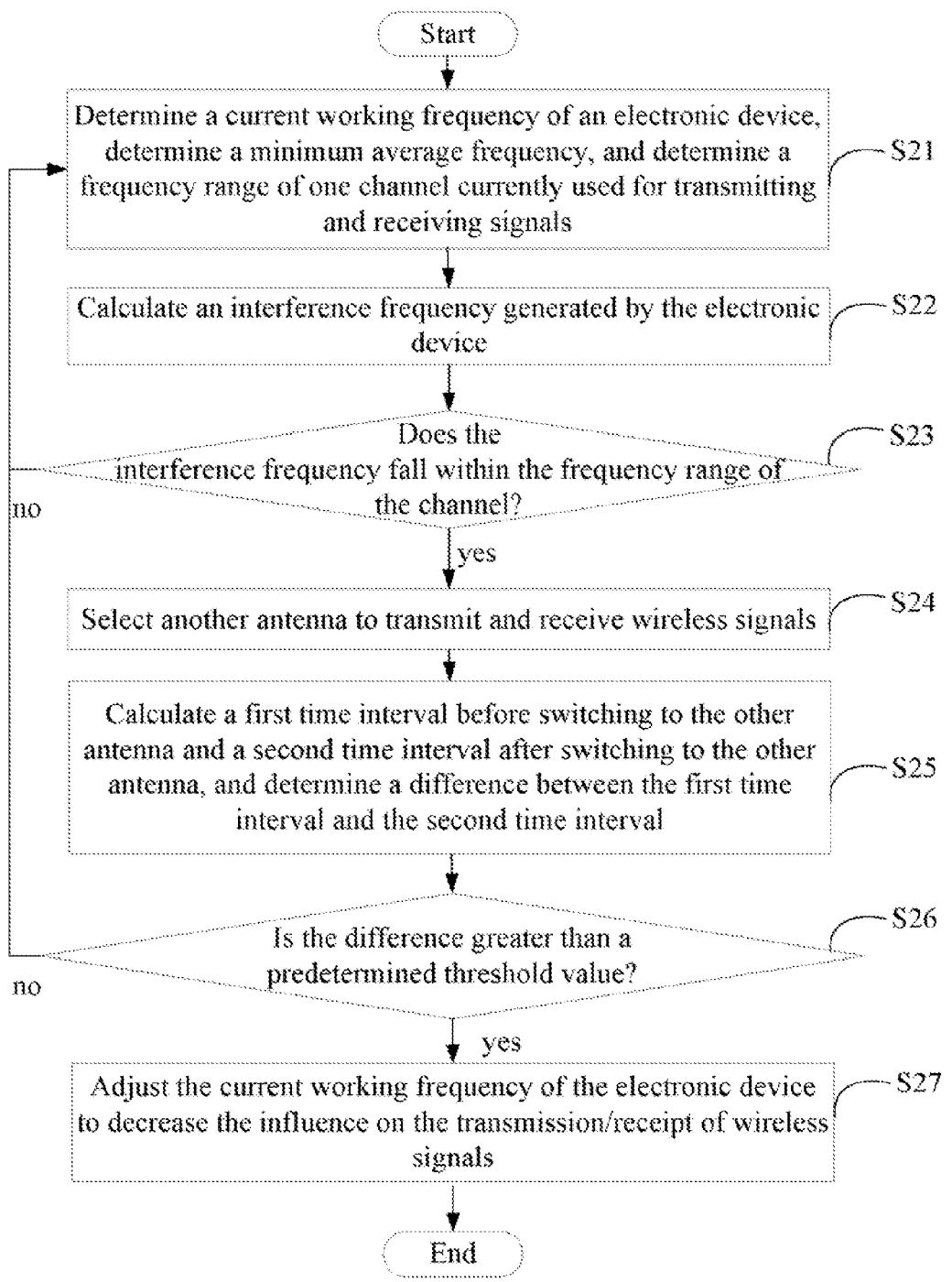
FIG. 2 is a flowchart of a method for adjusting the working frequency of the electronic device, in accordance with an exemplary embodiment.

FIG. 2 is a flowchart of a method for adjusting the working frequency of the electronic device 1, in accordance with an exemplary embodiment.

In step S21, the determining module 101 determines a current working frequency of the electronic device 1 according to the running speed of the storage unit 200 and the processor 300, determines a minimum average frequency in the table, and further determines the channel currently used for transmitting/receiving wireless signals and the frequency range of the determined channel according to the table.

In step S22, the calculating module 102 calculates an interference frequency generated by the electronic device 1 according to the current working frequency of the electronic device 1, the minimum average frequency, and the frequency range of the determined channel.

In step S23, the analyzing module 103 determines whether the interference frequency falls within the frequency range of the determined channel. If the determination is yes, the procedure goes to step S24; otherwise, the procedure goes back to step S21.

In step S24, the control module 104 selects another antenna to transmit and receive wireless signals.

In step S25, the calculating module 102 calculates a first time interval between transmitting and receiving wireless signals before switching to the other antenna, and a second time interval between transmitting and receiving wireless signals after switching to the other antenna, and further determines a difference between the first time interval and the second time interval to determine how much the influence is.

In step S26, the analyzing module 103 compares the calculated difference with a predetermined threshold value and determines whether the difference is greater than the predetermined threshold value. If the determination is yes, the procedure goes to step S27; otherwise, the procedure returns to step S21.

In step S27, the control module 104 adjusts the current working frequency of the electronic device 1 to decrease the influence on the transmission/receipt of wireless signals. After executing step S27, the procedure returns to step S21.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments.

What is claimed is:

1. An electronic device comprising:
   at least two antennas to transmit and receive wireless signals, the antennas respectively corresponding to different channels;
   a storage unit storing a plurality of modules, and a table, the table comprising an average frequency, and a frequency range for transmitting and receiving wireless signals of each of the channels; and
   a processor to execute the plurality of modules,
   wherein the plurality of modules comprises:
      a determining module configured to determine a current working frequency of the electronic device according to running speeds of the storage unit and the processor; determine a minimum average frequency in the table; and further determine which one channel is currently used for transmitting and receiving wireless signals and a frequency range of the determined channel according to the table;
      a calculating module configured to calculate an interference frequency generated by the electronic device according to the current working frequency, the minimum average frequency, and the frequency range of the determined channel;
      an analyzing module configured to determine whether the interference frequency falls within the frequency range of the determined channel; and
      a control module configured to select another antenna to transmit and receive wireless signals when the analyzing module determines that the interference frequency falls within the frequency range of the determined channel;
      the calculating module further configured to calculate a first time interval between transmitting and receiving wireless signals before switching to the other antenna, and a second time interval between transmitting and receiving wireless signals after switching to the other antenna, and determine a difference between the first time interval and the second time interval;
      the analyzing module further configured to compare the calculated difference with a predetermined threshold value; and
      the control module further configured to adjust the current working frequency of the electronic device to decrease the influence on the transmission/receipt of wireless signals when the calculated difference is greater than the predetermined threshold value.

2. The electronic device of claim 1, wherein the calculating module is further configured to calculate a bandwidth BW of the determined channel according to its frequency range, and calculates the interference frequency $v_i$ according to a formula:

$$v_i = v_c \times \left\{ \ln\!\left[ \frac{v_{min} - (BW)/2}{v_c} \right] + 1 \right\}$$

wherein $v_c$ denotes the current working frequency of the electronic device, and $v_{min}$ denotes the minimum average frequency.

3. The electronic device of claim 1, wherein the control module is further configured to maintain the current working frequency of the electronic device when the calculated difference is not greater than the predetermined threshold value.

4. A method for adjusting a working frequency of an electronic device, the electronic device comprising at least two antennas to transmit and receive wireless signals, the antennas respectively corresponding to different channels, and a storage unit storing a table, the table comprising an average frequency, and a frequency range for transmitting and receiving wireless signals of each of the channels, the method comprising:
   determining a current working frequency of the electronic device according to running speeds of the storage unit and the processor, determining a minimum average frequency in the table, and determining which one channel is currently used for transmitting and receiving wireless signals and a frequency range of the determined channel according to the table;
   calculating an interference frequency generated by the electronic device according to the current working frequency, the minimum average frequency, and the frequency range of the determined channel;
   determining whether the interference frequency falls within the frequency range of the determined channel, and selecting another antenna to transmit and receive wireless signals when the interference frequency falls within the frequency range of the determined channel;
   calculating a first time interval between transmitting and receiving wireless signals before switching to the other antenna, and a second time interval between transmitting and receiving wireless signals after switching to the other antenna;
   determining a difference between the first time interval and the second time interval; and
   comparing the calculated difference with a predetermined threshold value, and adjusting the current working frequency of the electronic device to decrease the influence on the transmission/receipt of wireless signals when the calculated difference is greater than the predetermined threshold value.

5. The method of claim 4, wherein calculating an interference frequency generated by the electronic device according to the current working frequency, the minimum average frequency, and the frequency range of the determined channel comprises:
   calculating a bandwidth BW of the determined channel according to its frequency range; and
   calculating the interference frequency $v_i$ according to a formula:

$$v_i = v_c \times \left\{ \ln\!\left[ \frac{v_{min} - (BW)/2}{v_c} \right] + 1 \right\}$$

wherein $v_c$ denotes the current working frequency of the electronic device, and $v_{min}$ denotes the minimum average frequency.

6. A storage medium storing a plurality of modules, the plurality of modules comprising instructions executable by a processor of an electronic device to perform a method for adjusting a working frequency of the electronic device, the electronic device comprising at least two antennas to transmit wireless signals, the antennas respectively corresponding to different channels, and a storage unit storing a table, the table comprising an average frequency, and a frequency range for transmitting and receiving wireless signals of each of the channels, the method comprising:
   determining a current working frequency of the electronic device according to running speeds of the storage unit and the processor, determining a minimum average frequency in the table, and determining which one channel is currently used for transmitting and receiving wireless signals and a frequency range of the determined channel according to the table;
   calculating an interference frequency generated by the electronic device according to the current working frequency, the minimum average frequency, and the frequency range of the determined channel;
   determining whether the interference frequency falls within the frequency range of the determined channel, and selecting another antenna to transmit and receive wireless signals when the interference frequency falls within the frequency range of the determined channel;
   calculating a first time interval between transmitting and receiving wireless signals before switching to the other antenna, and a second time interval between transmitting and receiving wireless signals after switching to the other antenna;
   determining a difference between the first time interval and the second time interval; and
   comparing the calculated difference with a predetermined threshold value, and adjusting the current working frequency of the electronic device to decrease the influence on the transmission/receipt of wireless signals when the calculated difference is greater than the predetermined threshold value.

* * * * *